United States Patent
Tsunashima et al.

[11] 3,900,249
[45] Aug. 19, 1975

[54] SOFT-FOCUS OPTICAL ELEMENT

[75] Inventors: Teruyoshi Tsunashima, Kawasaki; Teruo Kaneko; Takeo Ichimura, both of Tokyo, all of Japan

[73] Assignee: Nippon Kogaku K.K., Tokyo, Japan

[22] Filed: May 9, 1973

[21] Appl. No.: 358,466

[30] Foreign Application Priority Data
   May 15, 1972  Japan.............................. 47-47154

[52] U.S. Cl............................ 350/188; 350/175 GN
[51] Int. Cl. .............................................. G02b 13/20
[58] Field of Search ...................... 350/188, 175 GN

[56] References Cited
UNITED STATES PATENTS
2,353,257  7/1944  Mihalyi ............................... 350/188
3,486,808  12/1969  Aamblen ...................... 350/175 GN

*Primary Examiner*—Ronald J. Stern
*Assistant Examiner*—Conrad Clark
*Attorney, Agent, or Firm*—Fitzpatrick, Cella, Harper & Scinto

[57] ABSTRACT

A soft-focus optical element includes a transparent substrate of a predetermined refractive index having portions thereof penetrated by extraneous ions in accordance with a desired pattern preformed on the substrate, the ion-penetrated portions have a refractive index different from that of the rest of the substrate, and method of forming same.

7 Claims, 11 Drawing Figures

SOFT-FOCUS OPTICAL ELEMENT

BACKGROUND OF THE INVENTION

1. Field of the Invention

This invention relates to optical elements and more particularly, to a soft-focus optical element whose soft-focus effect does not vary with the size of the aperture opening. Two elements are included, one serving as an image-forming optical system (e.g., a lens) and the other serving as a non-image-forming optical system (e.g., a filter).

2. Description of the Prior Art

A soft-focus optical element is used as a component of an image forming optical system, or is used with such optical system to provide a soft-focus effect for the image formed by the optical system.

The soft-focus effect, that is, the effect of eliminating hardness and securing softness while maintaining a sharp core in a formed image, is sometimes required in taking portrait pictures or the like. There have heretofore been proposed two methods of providing a soft-focus effect:

i. the method whereby a suitable aberration of the image forming optical system may be retained; and ii. The method whereby a soft-focus optical element may be used as a component of an image forming optical system or used with such optical system.

The first method has been put into practice as a so-called soft-focus lens which can maintain a sharp focus core while forming an intense halo around the focus core. In this method, the condition of aberration, and accordingly the soft-focus effect, is greatly variable with the size of the aperture opening, and this leads to the disadvantage that almost all of the soft-focus effect is lost when the aperture is stopped down.

The second method has been put into practice as a so-called soft-focus filter which is used to form a flare. The soft-focus filter in actual use has concavo-convexities formed in a surface of a transparent glass substrate. the concavo-convexities in such surface may take various patterns such as uniform concavities or convexities, scattered spots, concentric circles, parallel lines, mesh-like lines or other linear patterns, and these may be formed by the use of any one of the mechanical, physical or chemical processes such as surface friction, engraving, bonding, embossing, evaporation, etching, etc.

The soft-focus filter suffers from various disadvantages such as loss of light or the overflare due to the scattering of light, blur of colors due to the difference in angle of refraction, loss of light due to absorption, and the coloring of the flare due to the absorption of specific wavelengths, and these are unavoidable by reason of the structure of such filter.

SUMMARY OF THE INVENTION

We have conceived a soft-focus optical element by which we are able to eliminate the foregoing difficulties and disadvantages. Thus, by our present invention we contribute the means to provide a soft-focus effect by subjecting portions of a transparent substrate to ion exchange thereby to vary the refractive index in such portions.

We achieve such a desirable result by means of a soft-focus optical element which comprises a transparent substrate of a predetermined refractive index and ion-penetrated portions formed in the transparent substrate by causing extraneous ions to penetrate into the substrate in accordance with a desired pattern preformed on the substrate, the ion-penetrated portions having a refractive index different from that of the rest of the transparent substrate.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawing, forming a part of the specification wherein:

DESCRIPTION OF THE PREFERRED EMBODIMENTS

Figure 1A:
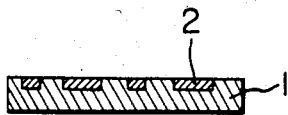
FIGS. 1A and 1B are schematic sectional views showing different forms of the soft-focus optical element.
Figure 1B:
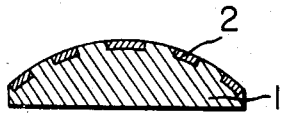
Figure 2A:
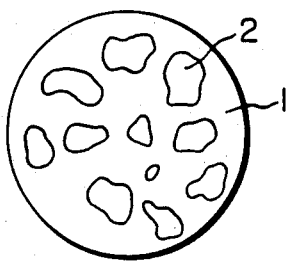
FIGS. 2A and 2B are schematic plan views of the respective elements of FIGS. 1A and 1B.
Figure 2B:
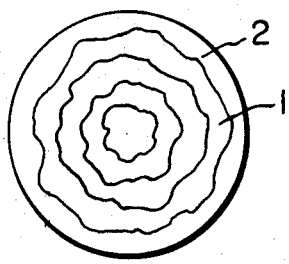
Figure 3A:
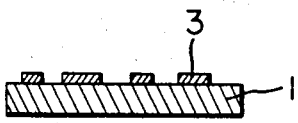
FIGS. 3A and 3B are schematic sectional views showing the respective substrates with silver film patterns formed thereon.
Figure 3B:
Figure 4A:
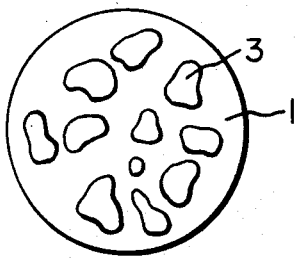
FIGS. 4A and 4B are schematic plan views showing the substrates and silver film patterns formed thereon.
Figure 4B:
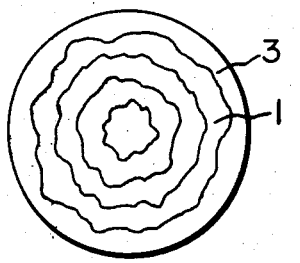

Referring to FIGS. 1A and 2A, a substrate 1 is transparent glass and has a predetermined refractive index. Ionexchanged portions 2 are transparent and have a different refractive index from that of the other portions. The light passed through the portions of the transparent substrate 1 in which no ion exchange has occurred, and accordingly in which there are no variations refractive index, may be focused in the focal plane of an image-forming optical system. In the other portions of the substrate which have been subjected to ion exchange and present a different refractive index from that of those portions which have been subjected to no ion exchange, there occurs a refraction effect to form a flare in the image formed in the focal plane of the imageforming optical system. In order to obtain a very desirable soft focus picture image having a sharp focus core and an intense flare therearound, the optical element according to the present invention depends largely on a diffraction effect of light which enters the boundary between the ion-penetrated portions and the remainder of the transparent substrate. To provide such a diffraction effect, the optical element must be provided with an almost infinite number of micro-shaped ion-penetrated portions, and each of the ion-penetrated portions must be indefinitely shaped to prevent the interference light produced by diffraction from appearing on the image surface. In this way, the soft-focus optical element according to the present invention can simultaneously provide a clear image formation with a soft tone.

Such a soft-focus optical element can be produced by subjecting an ion-exchangeable transparent substrate to ion exchange in a desired pattern.

The transparent substrate contains one or more types of alkali metal or other positive monovalent ions, such as thallium, silver, and copper ions. The ions may also be present in the form of any divalent or other multivalent ions which can readily be reduced to monovalent ions.

The desired pattern may be formed as a positive or negative pattern on the substrate by printing, masking or photofabrication.

The ion exchange may be accomplished by metal film vapor phase oxidation, metal film field oxidation or by the dipping technique.

By suitably selecting the conditions of the ion exchange, the variations in depth and refractive index of the ion-exchanged portions can be selected to the desired extent.

EXAMPLE 1

Figure 5:
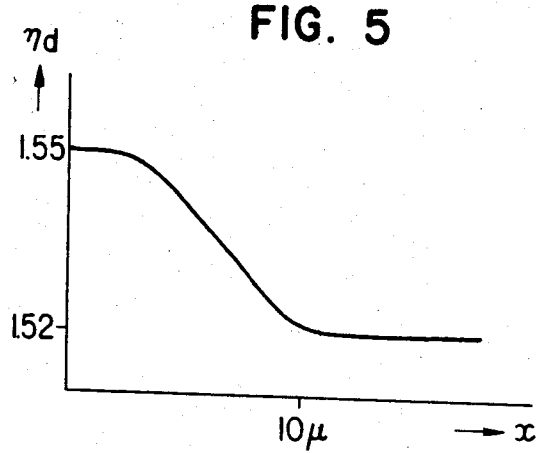
FIG. 5 is a graph illustrating the variation in refractive index along the depth of the ion-exchanged portions according to Example 1.
Figure 7:
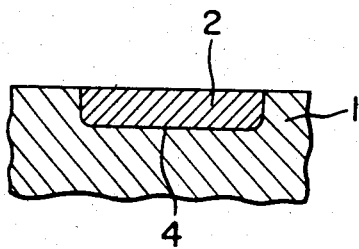
FIG. 7 is an enlarged, fragmentary, sectional view of an ion-exchanged portion.

A soft-focus optical element provided with a desired pattern can be produced in a manner to be described below. By the use of masking, a desired pattern of silver film is formed through evaporation on a smooth surface of a glass body containing sodium oxide. Thereafter, the glass body is placed in an environment of air containing 0.5 to 5 percent by weight of sulphur trioxide and heated therein at 200° to 450°C for 15 to 90 minutes, so that the silver is oxidized and activated to form silver ions. The silver ions are ion exchanged with the sodium ions in the glass thereby to penetrate into the glass material. Thus the portions penetrated by the silver ions increase the refractive index thereof to provide a soft-focus optical element. This is illustrated in FIGS. 1A, 1B, 2A, 2B, 3A, 3B, 4A and 4B. After a desired pattern of silver film has been formed on the substrate 1, the portions 2 are formed in which the silver ions have effected ion exchange. The refractive index in such ion-exchanged portions is increased as compared with that in the other portions which have not been subjected to ion exchange. The relation between the variation $nd$ in refractive index and the depth $x$ of the ion-exchanged portions is illustrated in FIG. 5, and an enlarged sectional view of an ion-exchanged portion is shown in FIG. 7. It is seen in FIGS. 5 and 7 that the portion in which silver ions have effected ion exchange has a refractive index continuously varying from the surface toward the interior or the substrate. Thus, the boundary portion 4 (see FIG. 7) between the silver ion-exchanged portion 2 and the underlying portion is free of light reflection. This means that the loss resulting from light reflection is reduced as compared with that in the conventional soft-focus filter.

The glass employed may also be one which is free of sodium oxide content but which contains potassium oxide or lithium oxide. In these cases, potassium or lithium ions are ionexchanged. Further, silver may be substituted for by a film of metal such as copper or thallium which can be oxidized to form monovalent ions. When the sodium ions are substituted for by copper or thallium ions, the portions of the glass body in which such substitution has taken place will be increased in refractive index.

The temperature in which the film of metal such as silver is heated in the environment of sulphur trioxide is variable with the type of glass used, and may suitably be in the range of 200° to 450°C. Too high temperatures might possibly reduce and color the silver ions which have already penetrated into the glass. Therefore, heating at temperatures above 450°C should preferably be avoided. Low temperatures below 200°C would wastefully increase the treatment time and this is impractical.

A copper film encounters greater difficulty in the oxidation-penetration than a silver film, and in addition, the copper ions that have penetrated are less reducible. For these reasons, heating temperatures in the range of 300° to 450°C are suitable for copper.

For a thallium film, the heating temperature may suitably range from 250° to 350°C.

The oxidation-penetration of the metal may alternatively be accomplished by the use of field heating, which involves the steps of forming electrodes on two opposed surfaces and applying a voltage with the metal film side as the positive pole thereby to heat the metal film.

When silver is to be oxidized to penetrate into a sheet of sodalime silica glass having a thickness of 1.2 mm., a voltage of 120V is suitable for a heating temperature of 350°C and a suitable heating time is 15 minutes. The field heating, however, imposes limitations on the configuration of the body to be treated. Nevertheless, this method is meritorious in that it can greatly reduce the heating temperature, and accordingly the possibility of coloring resulting from the reduction of the penetrated ions is reduced, as well as effecting a reduction in the treatment time.

EXAMPLE 2

A soft-focus element provided with a desired pattern can be produced in another manner to be described hereinafter.

Figure 6:
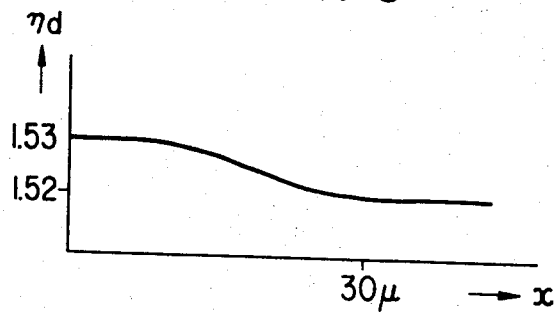
FIG. 6 is a graph illustrating the variation in refractive index along the depth of the ion-exchanged portions according to Example 2.

A negative pattern is formed on a surface of a glass substrate by means of a protective film of inactive material such as tin oxide, whereafter it is dipped in molten salt. After a penetration treatment has been completed, the protective film is removed. For example, a glass pate containing sodium ions is heated in molten potassium nitrate for two hours at a temperature of about 480°C. In the softfocus optical element thus provided, there is a refractive index variation $nd$ occurring in the direction of the depth $x$ of the layer in which the potassium ions have been ion-exchanged, as illustrated in FIG. 6.

If thallium-containing glass is heated in molten sodium nitrate for about 1 hour at a temperature of about 350°C., the thallium ions will be exchanged for sodium ions, and the ion-exchanged portions will have a reduced refractive index, which will lead to the provision of an optical element having a different soft-focus effect from that provided when the refractive index has been increased.

In the above process, the molten salt contains at least one kind of monovalent positive ion selected from the group consisting of alkali metal ions such as lithium ions, sodium ions, potassium ions, cesium ions and rubidium ions, thallium ions, silver ions and copper ions. The glass contains at least one ion selected from the group consisting of said alkali metal ions, thallium ions, silver ions and copper ions but different from the ions contained in the molten salt. However, ions with more than divalency, if readily reduced to monovalent ions, may be present.

Thus, according to the present invention, the soft-focus optical element provided through the ion exchange process is less variable in the soft-focus effect with the size of the lens aperture than soft-focus lenses of the prior art, and moreover, as compared with the soft-focus filter of the prior art, it is free of disadvantages such as the loss of light or overflare due to the scattering of light, blur of colors due to the difference in angle of refraction, loss of light due to absorption, and coloring of the flare due to the absorption of specific wavelengths. Also, the present invention simultaneously provides clear image formation and a soft tone.

We believe that the formation and function of our novel optical element will now be understood, and that the advantages of our invention will be fully appreciated by those persons skilled in the art.

We claim:

1. A soft-focus optical element comprising a transparent substrate of a predetermined refractive index, and an almost infinite number of micro-and indefinite shaped ion-penetrated portions formed in said transparent substrate in accordance with a desired pattern preformed on said transparent substrate, said ion-penetrated portions having a refractive index different from that of the rest of said transparent substrate.

2. A soft-focus optical element according to claim 1, in which said substrate is a glass and the difference between the refractive index of the bulk glass and that of the ionpenetrated portion produces an effective flare and clear portions simultaneously in an image formed by focusing light through said element.

3. A soft-focus optical element according to claim 1, in which said ion-penetrated portions include at least one kind of monovalent positive ions selected from the group consisting of alkali metal ions, thallium ions, silver ions and copper ions, and the portions of the transparent substrate other than said ion-penetrated portions include at least one kind of monovalent positive ions other than the ions included in said ion-penetrated portions and selected from the group consisting of alkali metal ions, thallium ions, silver ions and copper ions.

4. A soft-focus optical element according to claim 1, in which said transparent substrate is a plane-parallel plate which cannot form an image of the light passed therethrough.

5. A soft-focus optical element according to claim 1, in which said transparent substrate is an optical element which can focus only the light passed through the portions other than the ion-penetrated portions.

6. A soft-focus optical element according to claim 1, wherein said pattern is a positive pattern of an original image.

7. A soft-focus optical element according to claim 1, wherein said pattern is a negative pattern of an original image.

* * * * *